US012229222B2

(12) United States Patent
Sundararajan et al.

(10) Patent No.: US 12,229,222 B2
(45) Date of Patent: Feb. 18, 2025

(54) MACHINE LEARNING CLASSIFYING OF DATA USING DECISION BOUNDARIES

(71) Applicant: INTERNATIONAL BUSINESS MACHINES CORPORATION, Armonk, NY (US)

(72) Inventors: Mukundan Sundararajan, Bangalore (IN); Jignesh K Karia, Thane (IN); Radhika Sharma, Bangalore (IN); Ravindranath Nemani, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 616 days.

(21) Appl. No.: 17/499,279

(22) Filed: Oct. 12, 2021

(65) Prior Publication Data
US 2023/0112298 A1 Apr. 13, 2023

(51) Int. Cl.
*G06F 18/2411* (2023.01)
*G06F 18/21* (2023.01)
(Continued)

(52) U.S. Cl.
CPC ...... *G06F 18/2411* (2023.01); *G06F 18/2185* (2023.01); *G06F 18/23* (2023.01); *G06N 3/04* (2013.01)

(58) Field of Classification Search
CPC .. G06F 18/2411; G06F 18/2185; G06F 18/23; G06N 3/04; G06N 3/0464;
(Continued)

(56) References Cited

U.S. PATENT DOCUMENTS 6,104,835 A * 8/2000 Han .................. G06F 18/24143
382/225
6,327,581 B1 * 12/2001 Platt ....................... G06N 20/00
706/14
(Continued)

FOREIGN PATENT DOCUMENTS

CN 103632168 A * 3/2014
CN 103632168 B 1/2017
(Continued)

OTHER PUBLICATIONS

Mell, Peter, et al., "The NIST Definition of Cloud Computing," Sep. 2011, 7 pages.

*Primary Examiner* — Mahendra R Patel
(74) *Attorney, Agent, or Firm* — Tutunjian & Bitetto, P.C.; Michael A. Petrocelli

(57) ABSTRACT

Classifier accuracy is increased in machine learning applications by training a machine learning (ML) model including a classifier across classes by determining weighted input points for a contributing set to store the values for true positive and true negative predications. In a following step, input data is provided to the classifier of the machine learning model at runtime, and a classification output is determined from the classifier. For the classification output, values for input during runtime are compared with a sample of inputs stored for training the machine learning model to determine the distance in spread for the classification output. A class is determined from the classification output having a smallest distance and spread. The method can further determine if the class with the smallest distance and spread is a true positive or true negative by comparing the class with the smallest distance and spread with the classification output.

20 Claims, 8 Drawing Sheets

(51) Int. Cl.
*G06F 18/23* (2023.01)
*G06N 3/04* (2023.01)

(58) Field of Classification Search
CPC .......... G06N 3/084; G06N 3/09; G06V 10/70; G06V 10/82
USPC ........................................................ 382/159
See application file for complete search history.

(56) References Cited

U.S. PATENT DOCUMENTS

| | | | | |
|---|---|---|---|---|
| 7,054,847 | B2 * | 5/2006 | Hartman | G06Q 10/04 |
| | | | | 706/45 |
| 10,970,650 | B1 * | 4/2021 | Abusorrah | G06N 20/00 |
| 11,069,082 | B1 * | 7/2021 | Ebrahimi Afrouzi | H04N 23/56 |
| 11,599,752 | B2 * | 3/2023 | Briancon | G06N 5/04 |
| 11,734,937 | B1 * | 8/2023 | Pushkin | G06F 18/2155 |
| | | | | 706/12 |
| 2005/0049990 | A1 * | 3/2005 | Milenova | G06F 18/2411 |
| | | | | 706/45 |
| 2005/0131847 | A1 * | 6/2005 | Weston | G06F 18/2411 |
| | | | | 706/12 |
| 2006/0074908 | A1 * | 4/2006 | Selvaraj | G06N 7/01 |
| 2012/0054184 | A1 * | 3/2012 | Masud | G06F 16/285 |
| | | | | 707/E17.091 |
| 2019/0130228 | A1 * | 5/2019 | Fu | G06N 5/01 |
| 2020/0225673 | A1 * | 7/2020 | Ebrahimi Afrouzi | |
| | | | | A47L 11/4011 |
| 2020/0234088 | A1 * | 7/2020 | Taha | G06V 10/764 |
| 2020/0293878 | A1 * | 9/2020 | Bhaskar | G06Q 30/0201 |
| 2020/0387760 | A1 * | 12/2020 | Kamdar | G06F 18/2411 |
| 2023/0222336 | A1 * | 7/2023 | Redford | G06N 20/00 |
| | | | | 706/20 |

FOREIGN PATENT DOCUMENTS

| | | | | |
|---|---|---|---|---|
| JP | 2003331253 A | * | 11/2003 | ........... G06K 9/6857 |
| WO | WO-2018187953 A1 | * | 10/2018 | |
| WO | WO-2021102770 A1 | * | 6/2021 | |

* cited by examiner

| Evaluation details | Bag 2 prediction | Other prediction (other coat or bag) | Output Value |
|---|---|---|---|
| bag 2 v. bag 3 | FALSE | TRUE | 10.99054055 |
| bag 2 v. bag 5 | FALSE | TRUE | 9.812799975 |
| bag 2 v. bag 6 | FALSE | TRUE | 12.31504861 |
| bag 2 v. bag 7 | FALSE | TRUE | 8.086303333 |
| bag 2 v. coat | FALSE | TRUE | 16.40890409 |

FIG. 5

MACHINE LEARNING CLASSIFYING OF DATA USING DECISION BOUNDARIES

BACKGROUND

The present invention generally relates to machine learning, and in some embodiments to the classifier component of neural networks in machine learning applications.

Machine learning (ML) classifiers are an element used in many types of neural networks in various hues to solve several industry problems. In some examples, two or multi-class output classifier and several activation functions are used to obtain a classification with well-established boundaries. In the area of language processing, such as in chatbots, lower classification accuracy of the result text for a query can leave the end user or customers with lower satisfaction levels. A user having a bad experience in view of the poor classification accuracy can ask for human operator interaction, as opposed to continuing the conversation with the chatbots. This affects the help desk or specialist support automation levels.

The classification problem with False Positives (FP) or False negatives (FN) is widely applicable where improvement can increase the confidence levels of machine leaning (ML) solutions in several industries. While several approaches have been undertaken to improve the classification accuracy, there is still a need for newer approaches that can improve the accuracy in several classes of problems.

The next set of problems with classifiers is the confidence in the outputs of whether they decision made is consistent with, say the human decision as provided in the training and test data sets. This is more to say is the result a true or a false value of the cluster it is shown to belong to—whether it is a true positive or false positive, a true negative or false negative. Knowing if the end decision at runtime is a false positive, or a false negative is critical to alert if another decision authority is needed to supplement the decision from the classifiers, or whether that input has to be treated specially.

SUMMARY

In accordance with an embodiment of the present invention, a computer implemented method for increasing classifier accuracy in machine learning applications is provided that includes training a machine learning (ML) model including a classifier across classes by determining weighted input points for a contributing set to store the position and values for true positive and true negative predications. The method for increasing classifier accuracy also includes providing input data to the classifier of the machine learning model at runtime; and determining the classification output from the classifier. In some embodiments, for determining the classification output, the method compares the values for input during runtime with a sample of inputs stored for training the machine learning model to determine the average distance in spread for the classification output. The method for increasing classifier accuracy also determines a class from the classification output having a smallest distance and spread; and can then determine if the class with the smallest distance and spread is a true positive or true negative by comparing the class with the smallest distance and spread with the average distance of the classification output, wherein if the class having the smallest distance and spread that is smaller the average distance and spread of the classification output the class is designated a false positive or false negative. By more accurately training the classifier through more accurate detection of true positives and true negatives, processing time for computing hardware performing artificial intelligence and machine learning tasks is reduced. This is particularly suitable for artificial intelligence and machine learning tasks, such as machine vision and chatbot applications.

In accordance with another embodiment of the present invention, a system is also described for increasing classifier accuracy in machine learning applications. The system may include a hardware processor; and memory that stores a computer program product. The computer program product when executed by the hardware processor, causes the hardware processor to train a machine learning (ML) model including a classifier across classes by determining weighted input points for a contributing set to store the position and values for true positive and true negative predications. The system for increasing classifier accuracy can also provide input data to the classifier of the machine learning model at runtime; and determine the classification output from the classifier. In some embodiments, for determining the classification output, the method compares the values for input during runtime with a sample of inputs stored for training the machine learning model to determine the average distance in spread for the classification output. The system for increasing classifier accuracy can also determine a class from the classification output having a smallest distance and spread; and can then determine if the class with the smallest distance and spread is a true positive or true negative by comparing the class with the smallest distance and spread with the classification output, wherein if the class having the smallest distance and spread that is smaller the average distance and spread of the classification output the class is designated a false positive or false negative. By more accurately training the classifier through more accurate detection of true positives and true negatives, processing time for computing hardware performing artificial intelligence and machine learning tasks is reduced. This is particularly suitable for artificial intelligence and machine learning tasks, such as machine vision and chatbot applications.

In yet another embodiment, a computer program product is described for increasing classifier accuracy in machine learning applications. The computer program product includes a computer readable storage medium having computer readable program code embodied therewith. The program instructions executable by a processor to cause the processor to train a machine learning (ML) model including a classifier across classes by determining weighted input points for a contributing set to store the position and values for true positive and true negative predications. The program instructions for increasing classifier accuracy also to provide input data to the classifier of the machine learning model at runtime; and determine the determine the average distance in spread for the classification output from the classifier. In some embodiments, the computer program product determines the classification output by comparing the values for input during runtime with a sample of inputs stored for training the machine learning model to determine the distance in spread for the classification output. The computer program product for increasing classifier accuracy can also determine a class from the classification output having a smallest distance and spread; and can then determine if the class with the smallest distance and spread is a true positive or true negative by comparing the class with the smallest distance and spread with the classification output, wherein if the class having the smallest distance and spread that is smaller the average of the classification output the class is designated a false positive or false negative. By more accurately training the classifier through more accurate detection of true positives and true negatives, processing time for computing hardware performing artificial intelligence and machine learning tasks is reduced. This is particularly suitable for artificial intelligence and machine learning tasks, such as machine vision and chatbot applications.

BRIEF DESCRIPTION OF THE DRAWINGS

The following description will provide details of preferred embodiments with reference to the following figures wherein:

FIG. 5 is a table illustrating a calculation of true positives and false positives.

DETAILED DESCRIPTION

Figure 1:
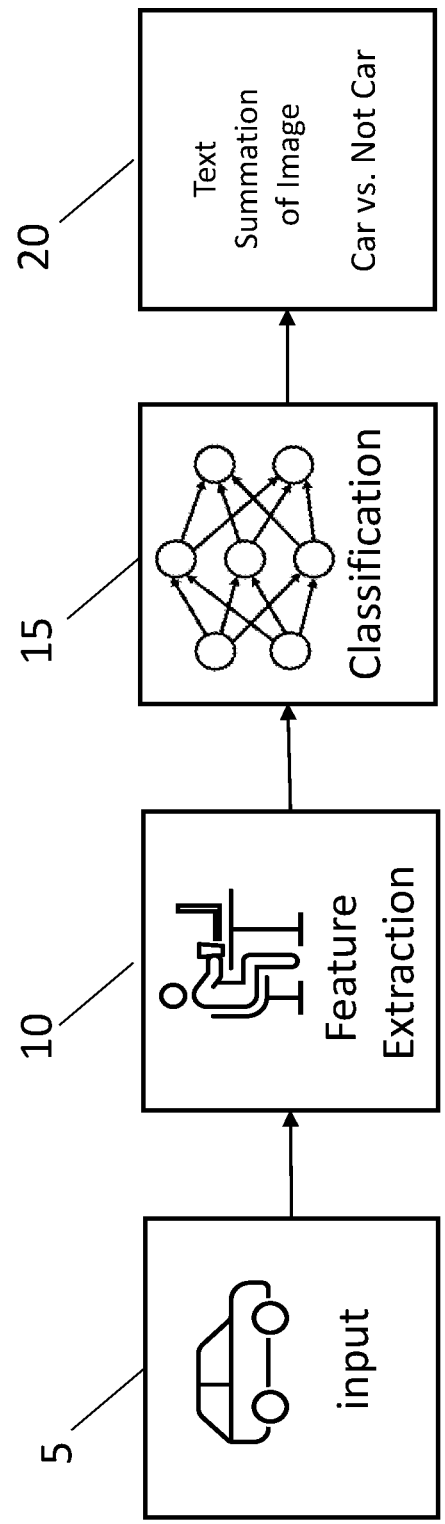
FIG. 1 is an illustration of an example environment in which the methods and systems of the present disclosure may be applied for a classifier accuracy improvement using a weight nudge approach on decision boundaries.

The present invention generally relates to machine learning (ML) classifiers in an application of neural networks. Sensitivity analysis of a classification does not allow for improvement in either confidence levels of the classification, and a sensitivity analysis will not show if an output is a false positive. Soft k-means provides a weighted distance approach. However, soft-k means analysis is only at the output level for each input data point. These methods need a re-training of the classifier, essentially moving the class boundary to include the new data points, where false positives and false negatives occur. Re-training the classifier is expensive, as the classifier have to continuously be retrained if a number of new inputs lie close to the boundaries. Other approaches use post-output processing, and receiver operating characteristic (ROC) graphs.

The methods, systems and computer program products of the present disclosure look at the issue of whether a classification is a true positive or false positive, or true negative or false negative, by addressing the question of what if the new input that lies at a distance (dl) from significant input points across samples of various class objects starting from the first layer and then going to the layer before the output layer, at each layer the distance between the input and some of the class examples are obtained.

A "class" is a set of enumerated target values for a label. For example, in a binary classification model that detects spam, the two classes are spam and not spam. In a multi-class classification model that identifies dog breeds, the classes would be poodle, beagle, pug, and so on.

For each cluster, a set of random images or truly representative images, or a combination are taken, and the top contributed weighted inputs are each layer are stored, such as those weighted inputs that show a 10% or 20% variation from a peak value. A "cluster" is a collection of data items which are "similar" between them, and "dissimilar" to data items in other clusters. This is used for the comparison and distance calculation. The cluster class that exhibits the smallest distance, and closeness factor in comparison to the those that exhibit longer distance, and a spread in closeness is the representation of the class. This is compared to the output from the classifier, and if the values are the same, then it is a true positive. If there is a cluster difference between that provided by the classifier and the computed on from the layer wise distance, then the output is a false positive.

Neural networks cluster and classify. Neural networks can be thought of as a clustering and classification layer on top of the data that is being stores and manage. The neural networks help to group unlabeled data according to similarities among the example inputs, and they classify data when they have a labeled dataset to train on.

One consideration is that the machine learning layers over the training corpus had learned the weights and the effect of all the weights is not be considered, because in the proposed methods, systems and computer program products only the top weighted input points are considered from the set of input points.

However, when an input is evaluated to belong to a class by the trained machine learning (ML) model, the weight matrix and the output decision thresholds are used to compute the distance dl, and are assigned to a cluster. The weight matrix is considered to find out those weights that have driven the input computation to that distance di from the other images. The input values of those points from the input set that have contributed to the largest impact are taken from any of the sample images of a class. These values are replaced in the input data set, and both the new class distance and spread as well as the classifier output are taken to determine if such a replacement caused a false positive result to move ("nudged") to a true positive result which helps to determine which are the influencing input points. This is run across the set of sample images for the class of inputs to determine how many times the output has changed to true positive, which also yields the answer to whether a specific group of the input points alone contributed to the false positive classification or whether it was spread across a large part of the input data set. If it is the later, then the mapping should yield a better true positive match for other classes. If the same variation is obtained across all the classes, then the quality of input has to be enhanced with another input data set or other pre-filtering operations have to be performed on the input data set. This replacement of the key input data points to determine what changes impact the output classification positively to move to a more accurate true positive classification for a class in a group of output classes However, looking at the weight contribution, since it is a linear operation, across the network from input to output till the activation function, one can come up with the paths that have the highest contribution.

The methods, systems and computer program products described herein provide an approach to determining if a machine learning (ML) conclusion is a true positive or a false positive belonging to a cluster/classes. In some embodiments, the methods and systems provide a determination of the node influences and the impact of the input values. The methods and systems provide a determination of aspects of the image/inputs that are being abstracted in each layer in the machine learning environment. In some embodiments, the methods and systems described herein can provide a determination of input quality to recommend either more input filtering of the input data set or a fresh input recommendation in a machine learning (ML) environment. In some embodiments, the methods and systems can provide a determination of an image to obtain a false positive output across multiple classes, e.g., a robustness factor of the model. In some embodiments, the methods and symbols use samples from training/testing when in supervised mode to determine distance and cluster spread to produce better outcomes from classification. The methods, systems and computer program products provide a mechanism to reduce the churn in use of automatons for helping clients.

In some embodiments, the methods, systems, and computer program products can solve a problem in the runtime of whether an output is a true positive or a false positive. Further, the methods can help to resolve what part of the input is contributing to the false positives so that those inputs can be better captured. The method, systems and computer program products of the present disclosure are now described in greater detail with reference to FIGS. 1-8.

Figure 2:
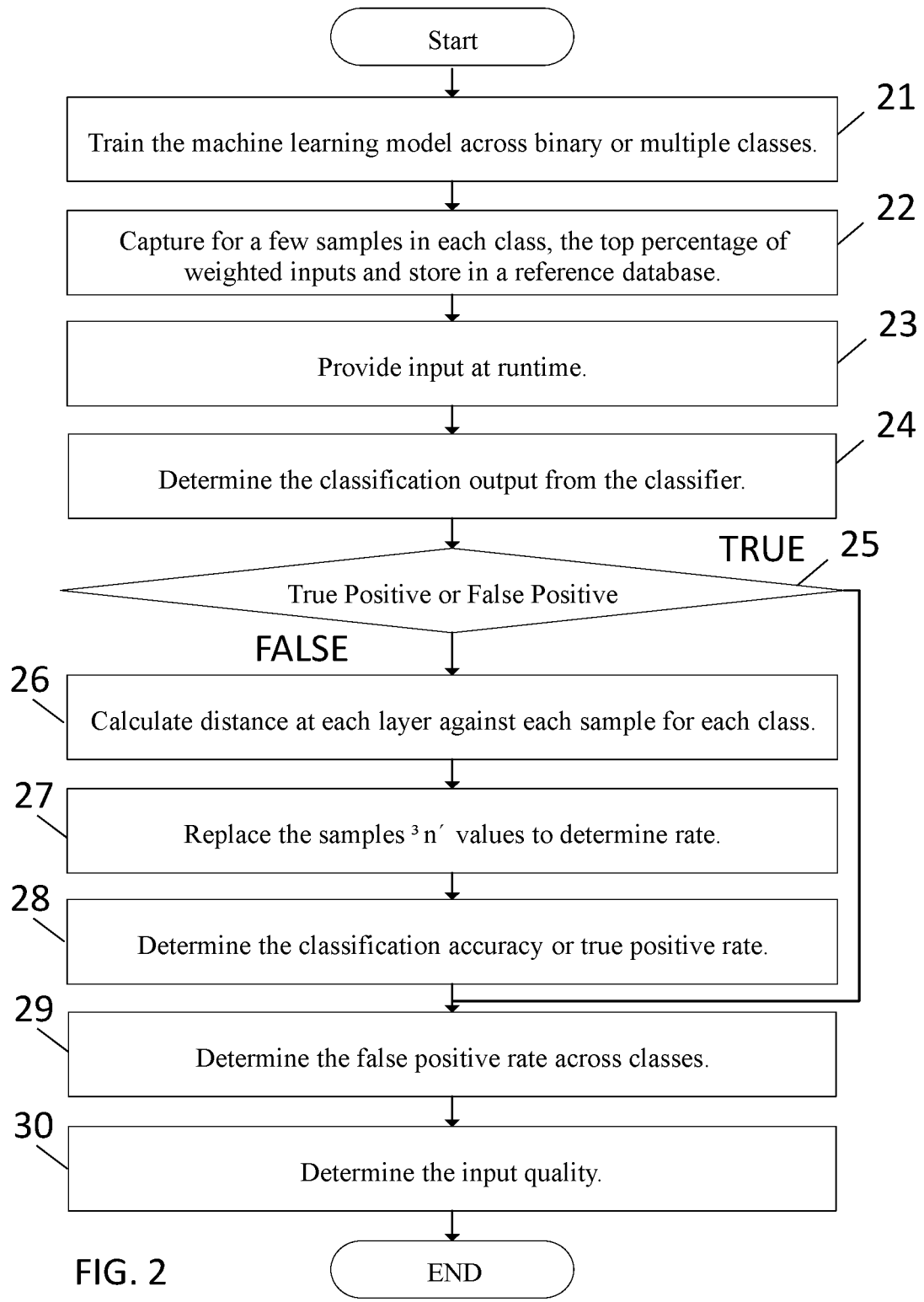
FIG. 2 is a block/flow diagram illustrating a method for classifier accuracy improvement using weight nudge approach on decision boundaries, in accordance with one embodiment of the present disclosure.
Figure 3:
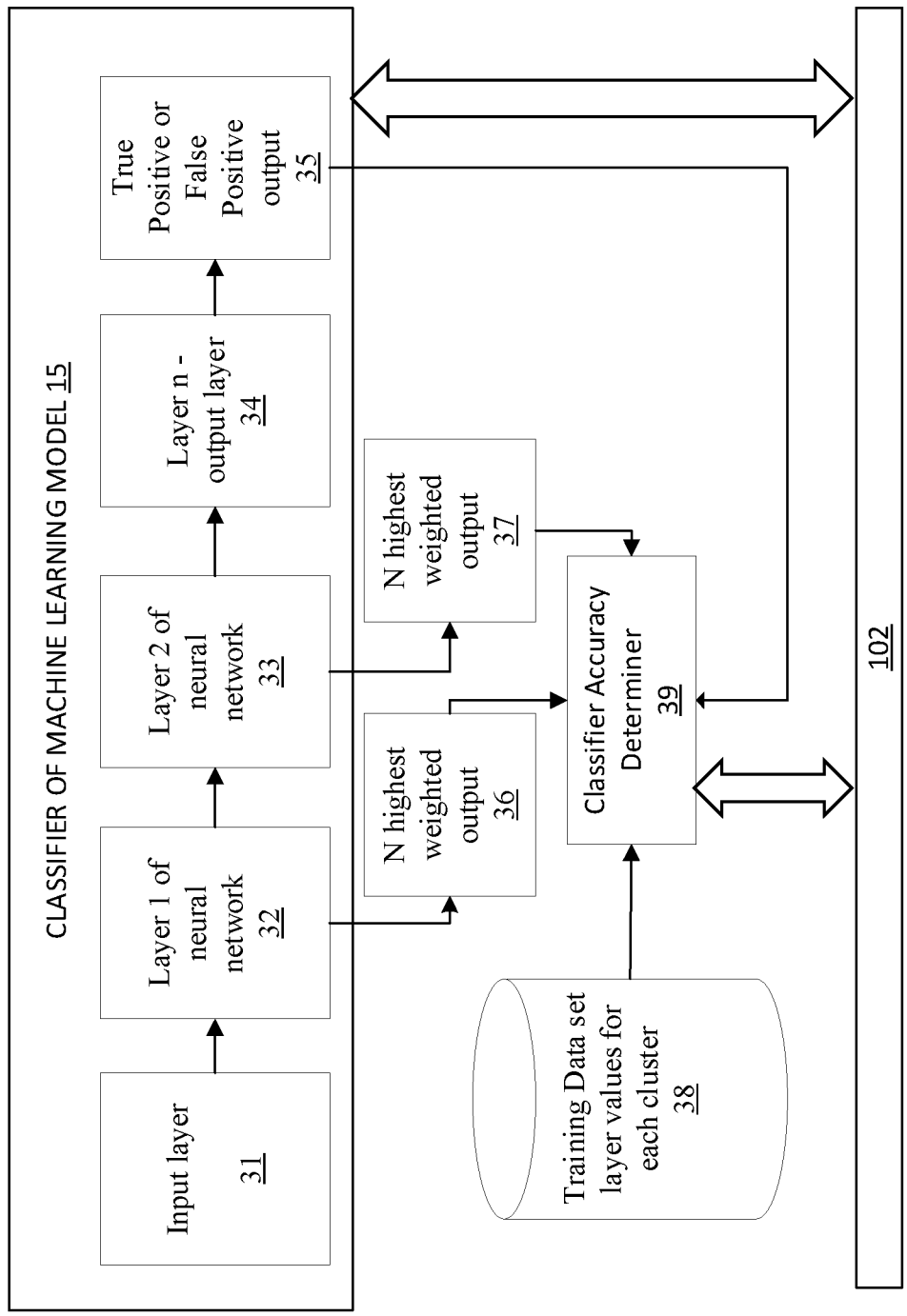
FIG. 3 is a block diagram illustrating a system for classifier accuracy improvement using weight nudge approach on decision boundaries, in accordance with one embodiment of the present disclosure.

FIG. 1 is an illustration of an example environment in which the methods and systems of the present disclosure may be applied for a classifier accuracy improvement using a weight nudge approach on decision boundaries. FIG. 2 is a block/flow diagram illustrating a method for classifier accuracy improvement using weight nudge approach on decision boundaries. FIG. 3 is a block diagram illustrating a system for classifier accuracy improvement using weight nudge approach on decision boundaries, which may be employed in the method depicted in FIG. 2.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

FIG. 1 illustrates machine learning, in which experts use their knowledge and time to craft a set of features that can be extracted from the input, and can be used to train a classification network to produce an output. In the example, depicted in FIG. 1, a network is trained to identify a car from images, e.g., in the sense of machine vision. In one example, the input is an image of a vehicle. The feature extraction step 10 includes extracting features from the input, and the classification step 15 include training the model to predict the outcome 20. For example, machine learning can employ a neural network to identify from the extracted features of the image whether a car is present. The output is the conclusion of the estimation, e.g., whether a car is present or not. The methods, systems and computer program products improves the machine learning classifier by using a weight nudge approach on decision boundaries by computing distance at each layer against each sample for each class for a data cluster to detect/reduce false positives and negatives. Although FIG. 1 illustrates one example of machine vision, the applications for the methods, systems and computer program products of the present disclosure can include chat solutions, image recognition, and speech recognition. Any solution with a classifier and a cluster output determination—bi- or multi-class clusters driving the classifiers are suitable for the methods and systems described herein.

Figure 4:
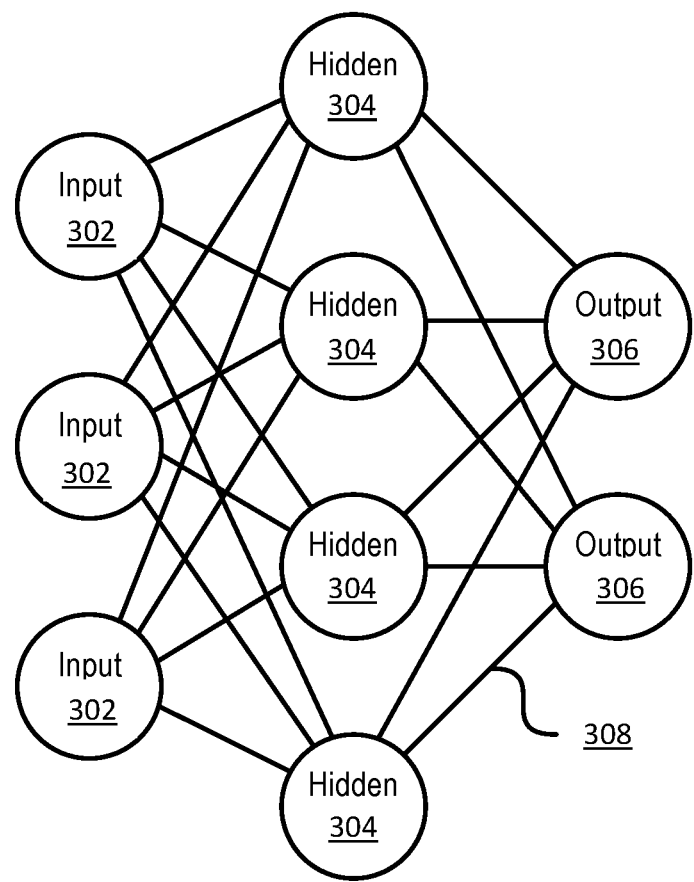
FIG. 4 is a generalized diagram of a neural network.

Referring now to FIG. 4, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 302 that provide information to one or more "hidden" neurons 304. Connections 308 between the input neurons 302 and hidden neurons 304 are weighted, and these weighted inputs are then processed by the hidden neurons 304 according to some function in the hidden neurons 304. There can be any number of layers of hidden neurons 304, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 306 accepts and processes weighted input from the last set of hidden neurons 304.

This represents a "feed-forward" computation, where information propagates from input neurons 302 to the output neurons 306. Upon completion of a feed-forward computation, the output is compared to a desired output available from training data. The error relative to the training data is then processed in "backpropagation" computation, where the hidden neurons 304 and input neurons 302 receive information regarding the error propagating backward from the output neurons 306. Once the backward error propagation has been completed, weight updates are performed, with the weighted connections 308 being updated to account for the received error. It should be noted that the three modes of operation, feed forward, back propagation, and weight update, do not overlap with one another. This represents just one variety of ANN computation, and that any appropriate form of computation may be used instead. In the present case the output neurons 306 provide analysis of whether a package has been handled correctly according to the data provided from the input of the IoT sensors.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 308 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs. Alternatively, the weights 308 may be implemented as resistive processing units (RPUs), generating a predictable current output when an input voltage is applied in accordance with a settable resistance.

The ANN depicted in FIG. 4 may be employed in the classification step 15 of the machine learning environment that is depicted in FIG. 1.

FIG. 2 illustrates a method for classifier accuracy improvement using weight nudge approach on decision boundaries. It is noted that the process flows illustrated by description of the blocks illustrated in FIG. 2 are not an exclusive list. A number of intermediate steps, preliminary steps and concluding steps may also be applicable to the methods described herein.

In some embodiments, the computer implemented method for classifier accuracy improvement using weight nudge approach on decision boundaries may begin with block 21 of FIG. 2. Block 21 includes training a machine learning (ML) model across binary or multiple classes. An artificial intelligence (AI)/machine learning model can be created by training the n-layer 34, which is the output from the neural network, as depicted in FIG. 3.

In the testing phase, for every true positive or true negative, the weighted input points are determined in the input set contributing to the significant values in each layer in order to store the position and values. True Positive (TP) refers to the number of predictions where the classifier correctly predicts the positive class as positive. True Negative (TN) refers to the number of predictions where the classifier correctly predicts the negative class as negative.

The contributing set is equal to:

$$\{x_n | y_n/y_{peak} > 0.9\}, \text{ in which} \qquad \text{Equation 1:}$$

Xn is equal to a significant input going into a neuron/AI layer

Yn is equal to the weighted input "n" to a neuron/AI in a layer

Ypeak is equal to highest or most significant value of the weighted input for all neurons in that AI layer.

At block 22, the method captures a few samples in each class, in which the top percentage of the weighted inputs are stored in a reference database. Referring to FIG. 3, the reference database may be provided by the storage for the training data set layer values for each cluster that is identified by reference number 36.

Referring to FIG. 2, the method may continue with providing input to the classifier at runtime at block 23. Referring to the system in FIG. 3, the input layer of the classifier 15 is identified by reference number 31. The output layer of the classifier 15 is identified by reference number 34. A plurality of layers, e.g., layer 1 of the neural network identified by reference number 32, and layer 2 of the neural network identified by reference number 33, are present between the input layer 31 and the output layer (layer n) 34.

In a following step, at block 24, the method can determine the classification output from the classifier 15. In the runtime phase, for an input, the method compares the input with the sample of inputs stored to determine the distance with all other prior run/sample results (a scalar value). This can be provided by the classifier accuracy determiner engine 39 of the system depicted in FIG. 3. From each layer between the input and the output, the classifier accuracy determiner engine 39 receives the highest weighted output, e.g., N highest weighted output from layer 1 of the neural network identified by reference number 36 and the N highest weighted output from layer 2 of the neural network identified by reference number 37. The sample of inputs stored is provided by the training data set layer values for each cluster, which also has a feed into the determiner engine 39. The classifier accuracy determiner engine 39 can then find the distances and the cluster speed.

The distances and cluster spread can be calculated by the determiner engine 39 using the following equations:

$$\text{Distance at each } x_n d_n = \text{sqrt}(\text{sqr}(x_{ninput} - x_{nsample}) + \text{sqr}(v_{ninput} - v_{nsample})) \qquad \text{Equation 2:}$$

$$\text{Total distance} = \Sigma d_n / n, \text{ in which:} \qquad \text{Equation 3:}$$

do is equal to distance for the significant input "n".

sqrt is equal to square root.

sqr is equal to square.

$v_{ninput}$ is equal to weighted input for element "n".

$v_{nsample}$ is equal to weighted input for element "n" in the considered sample.

$x_{ninput}$ is equal to input for element "n".

$x_{nsample}$ is equal to input for element "n: in the considered sample.

From Equations 2 and 3, the determiner engine 38 can determine the class with smallest distances and spread, and compare with the classification output to determine if it is a true positive or a false positive at block 25 of the method depicted in FIG. 2.

If at block 25, it is determined that a false positive has occurred, the method can continue to calculate the distance at each layer against each sample for each class at block 26 of FIG. 2. If it is a false positive, the method can continue with selecting each or a few of the input sets from the class that had the smallest distance and replace the n values in the runtime input set with those values of the sample set at block 27. Determine the true positive samples as returned by the classification. This shows the set of points in the input set that are sensitive. Block 28 includes determining the classification accuracy or true positive rate.

In a following process step, the method can determine the false positive rate across the classes at block 29 in order to determine the strength of the input at block 30 of the method depicted in FIG. 2. Blocks 25-30 of the method depicted in FIG. 2 may per formed by the classifier accuracy determiner engine 39 of the system depicted in FIG. 3.

In some examples, the method depicted in FIG. 2 can employ machine learning in applications for machine vision, e.g., identification of objects by machine vision. In other examples, the method depicted in FIG. 2 can be employed to provide answers to questions provided to chatbots.

FIG. 5 is a table illustrating a calculation of true positives and false positives for determining the false positive potential across classes to determine the strength of input in the application of machine vision. In the example depicted in FIG. 5, the machine learning application is attempting to identify a bag type, e.g., bag type 2, amongst other types of bags, e.g., Bag3, Bag5, Bag6, Bag7, and other types of objects.

The sample calculation illustrated in the table depicted in FIG. 5 shows the output from such a calculation as described with respect to FIGS. 1-3 at the first layer of the classifier. Bag2 is a false positive for class coat. Against the input samples for Bag {Bag3, Bag5, Bag6, Bag7}, the output value is between 8.08 and 12.3 while the distance to coat is 40% higher from the maximum Bag value. Hence the classification as a coat is a false positive. Replacing Bag2 with the n values from any of the Bag provides and output value <12 and will show the classification by the ML model as Bag than a coat is equal to a true positive.

Figure 6:
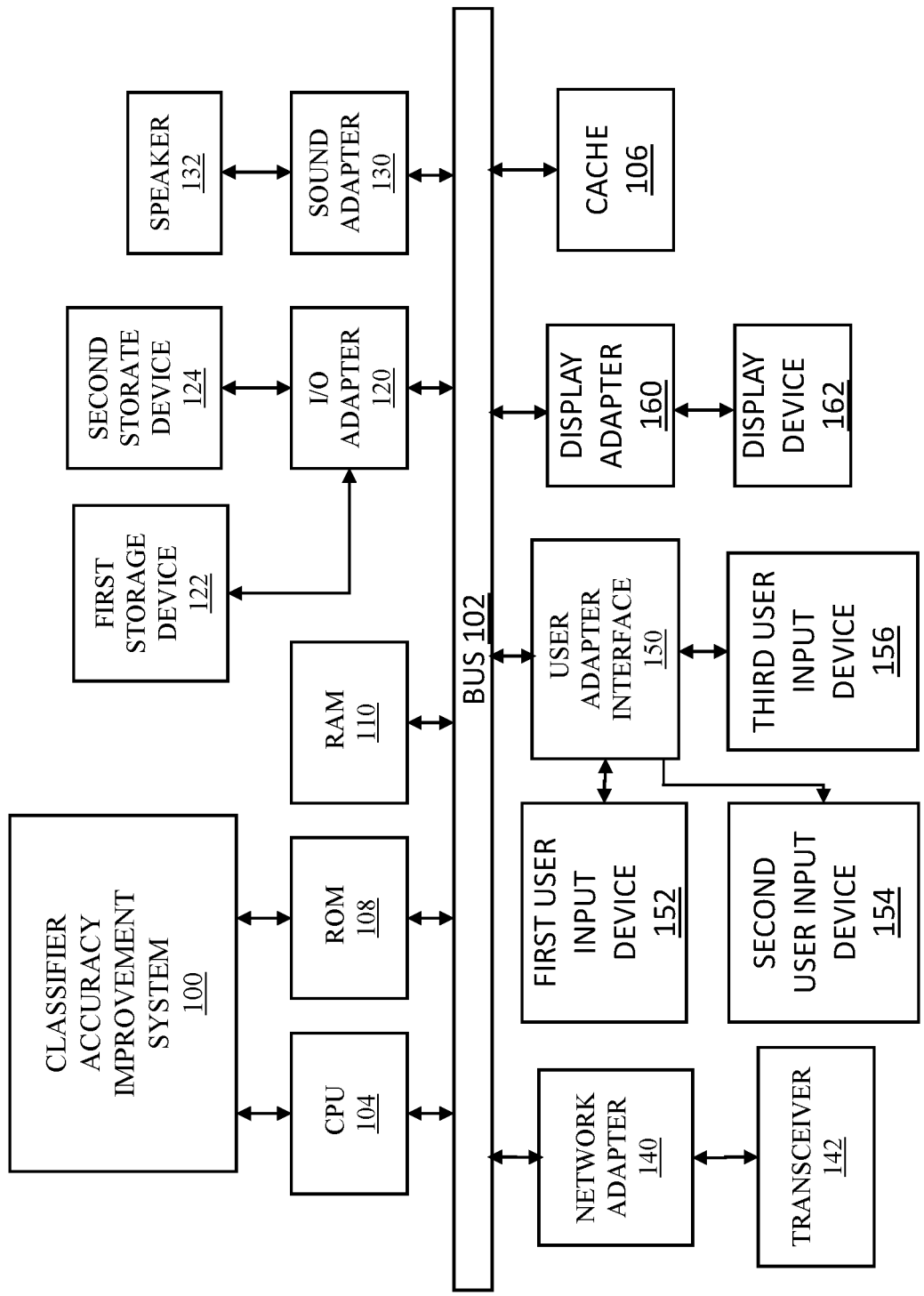
FIG. 6 is a block diagram illustrating a system that can incorporate the system for classifier accuracy improvement using weight nudge approach on decision boundaries that is depicted in FIG. 3, in accordance with one embodiment of the present disclosure.

The system 100 for increasing classifier accuracy in machine learning applications (including the classifier of the machine learning model 15, the classifier accuracy determiner 39, and the training data set layer 38) may be integrated via bus 102 into the processing system 400 depicted in FIG. 6. The processing system 400 includes at least one processor (CPU) 104 (also referred to as hardware processor) operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components as will be described herein.

As employed herein, the term "hardware processor subsystem" or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The system 400 depicted in FIG. 6, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product including a non-transitory computer readable storage medium having computer readable program code embodied therein for providing a plurality of questions from a presentation. In some embodiments, the computer program product is for increasing classifier accuracy in machine learning applications. The computer program product can include a computer readable storage medium having computer readable program code embodied therewith. The program instructions executable by a processor to cause the processor to train a machine learning (ML) model including a classifier across classes by determining weighted input points for a contributing set to store the position and values for true positive and true negative predications; and provide input data to the classifier of the machine learning model at runtime. The program instructions can also determine, using the processor, a classification output from the classifier, wherein for the classification output the method compares the values for input during runtime with a sample of inputs stored for training the machine learning model to determine the distance in spread for the classification output. The program instructions can also determine, using the processor, a class from the classification output having a smallest distance and spread; and determine, using the processor, if the class with the smallest distance and spread is a true positive or true negative by comparing the class with the smallest distance and spread with the classification output.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
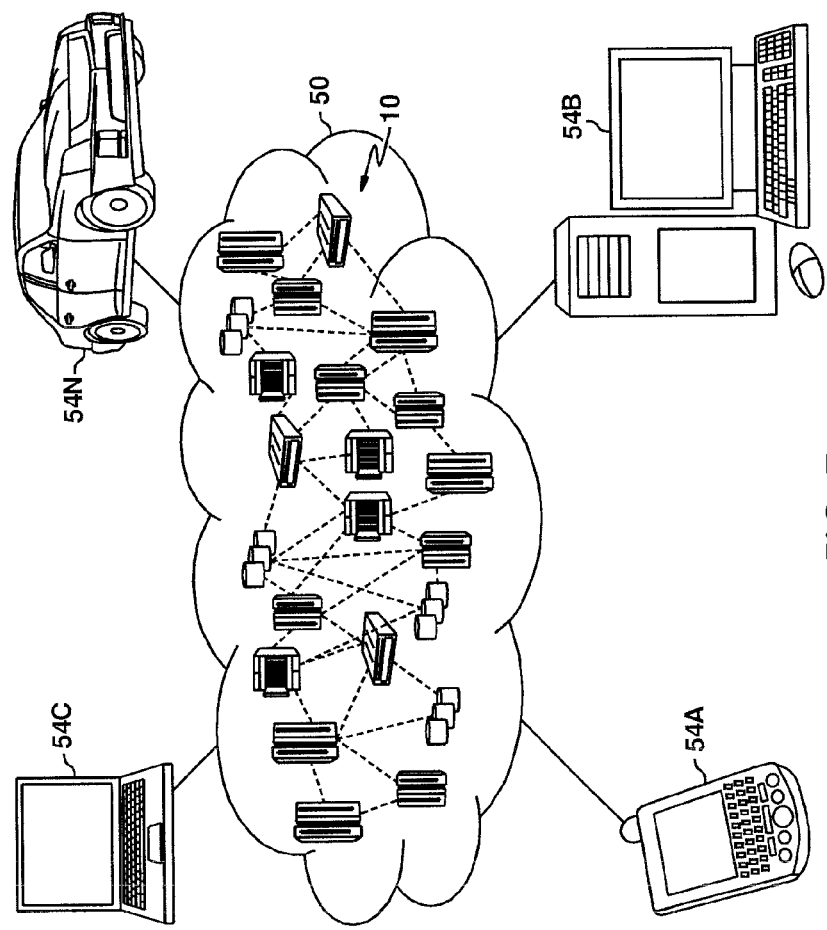
FIG. 7 depicts a cloud computing environment according to an embodiment of the present disclosure.

Referring now to FIG. 7, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 51 and cloud computing environment 50 can communicate with any type of computerized device over any type of network and/or network addressable connection (e.g., using a web browser).

Figure 8:
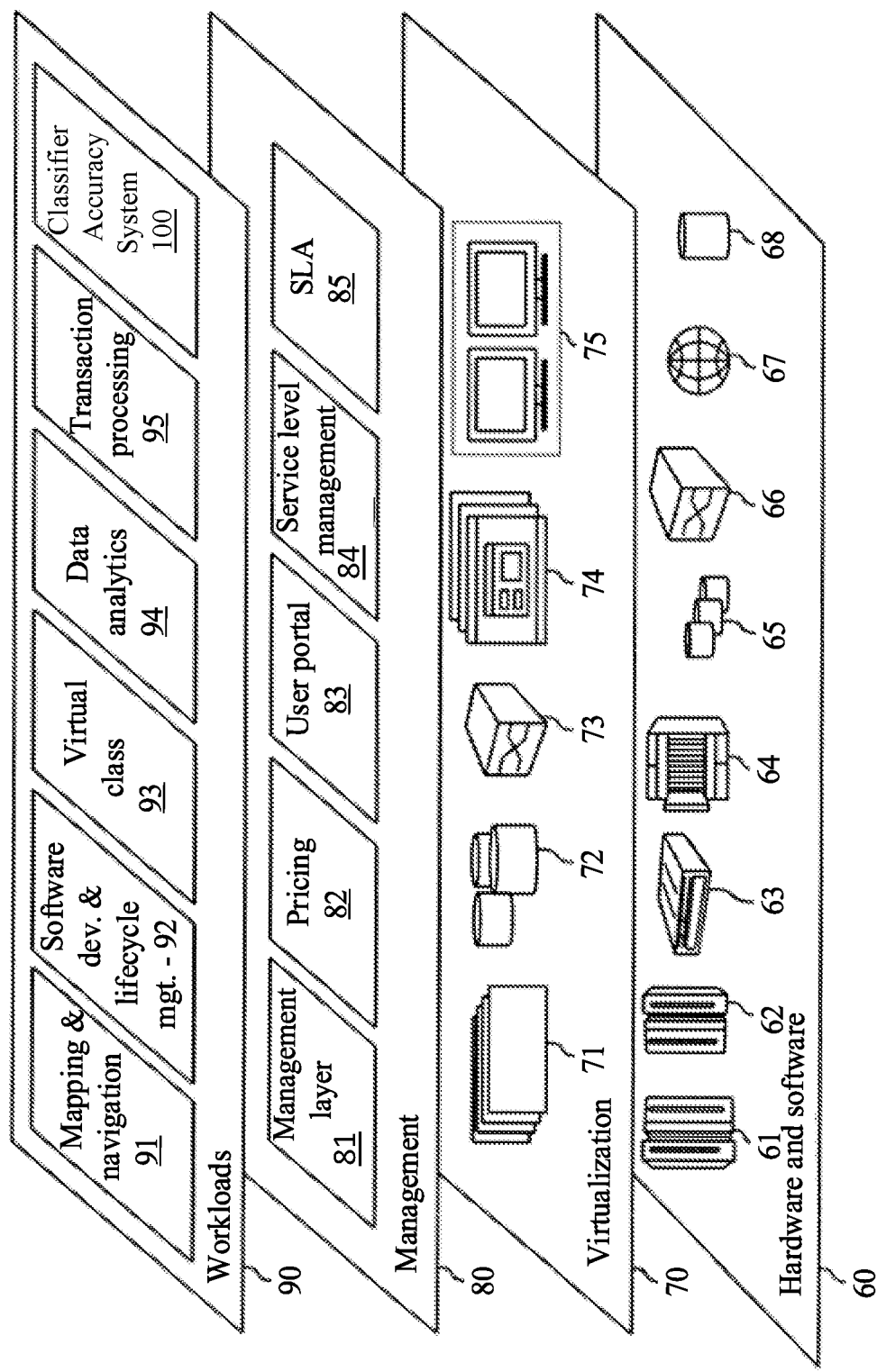
FIG. 8 depicts abstraction model layers according to an embodiment of the present disclosure

Referring now to FIG. 8, a set of functional abstraction layers provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and classifier accuracy system 100, which is described with reference to FIGS. 1-5.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Having described preferred embodiments of a system for classifier accuracy improvement using a weight nudge approach on decision boundaries, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for increasing classifier accuracy in machine learning applications comprising:
    training a machine learning (ML) model including a classifier across classes by determining weighted input points for a contributing set to store the position and values for true positive and true negative predications;
    receiving input data to the classifier of the machine learning model at runtime;
    determining a classification output from the classifier, wherein for the classification output the method compares the values for input during runtime with a sample of inputs stored for training the machine learning model to determine an average distance in spread for the classification output;
    determining a class from the classification output having a smallest distance and spread; and
    characterizing the class with the smallest distance and spread as a true positive or true negative by comparing the class with the smallest distance and spread with the classification output, wherein if the class having the smallest distance and spread that is smaller the average of the classification output the class is designated a false positive or false negative.

2. The computer-implemented method of claim 1, wherein the input data is a query, and the true positive or the true negative is a correct answer to the query.

3. The computer-implemented method of claim 1, wherein each of the true positive or the true negative is a class of answers.

4. The computer-implemented method of claim 3, wherein the class can be binary or multi-class.

5. The computer-implemented method of claim 1, wherein the determining of the weighted input points for the contributing set comprises a calculation of $\{x_n | y_n / y_{peak} > 0.9\}$, in which Xn is equal to a significant input going into a neuron/AI layer, Yn is equal to the weighted input "n" to a neuron/AI in a layer, and Ypeak is equal to highest or most significant value of the weighted input for all neurons in that AI layer.

6. The computer-implemented method of claim 1, wherein the classifier of the machine learning model includes plurality of layers that provides a neural network, the plurality of layers including an input layer and an output layer having middle layers present therebetween.

7. The computer-implemented method of claim 1, wherein the input can be images for identification extracted from a data set by feature extraction element of the machine leaning engine.

8. The computer-implemented method of claim 1, wherein the determining of the classification output from the classifier includes a determiner engine that for each layer between the input and the output, wherein the determiner engine receives the sample of inputs stored the training data set layer values, and from comparison of the sample inputs to each layer of the draining data set, the determiner engine can find the distances and the cluster spread with the calculation:

$$\text{Distance at each } x_n d_n = \text{sqrt}(\text{sqr}(x_{ninput} - x_{nsample}) + \text{sqr}(v_{ninput} - v_{nsample})) \text{ and}$$

$$\text{Total distance} = \Sigma d_n / n, \text{ wherein:}$$

dn is equal to distance for the significant input "n",
sqrt is equal to square root,
sqr is equal to square,
$v_{ninput}$ is equal to weighted input for element "n",
$v_{nsample}$ is equal to weighted input for element "n" in the considered sample,
$x_{ninput}$ is equal to input for element "n", and
$x_{nsample}$ is equal to input for element "n" in the considered sample.

9. A system for increasing classifier accuracy in machine learning applications comprising:
    a hardware processor; and
    a memory that stores a computer program product, which, when executed by the hardware processor, causes the hardware processor to:
    train a machine learning (ML) model including a classifier across classes by determining weighted input points for a contributing set to store the position and values for true positive and true negative predications;
    receive input data to the classifier of the machine learning model at runtime;
    determine a classification output from the classifier, wherein for the classification output the method compares the values for input during runtime with a sample of inputs stored for training the machine learning model to determine an average distance in spread for the classification output;
    determine a class from the classification output having a smallest distance and spread; and
    determine if the class with the smallest distance and spread is a true positive or true negative by comparing the class with the smallest distance and spread with the classification output, wherein if the class having the smallest distance and spread that is smaller the average of the classification output the class is designated a false positive or false negative.

10. The system of claim 9, wherein the input data is a query, and the true positive or the true negative is a correct answer to the query.

11. The system of claim 9, wherein each of the true positive or the true negative is a class of answers.

12. The system of claim 9, wherein the class can be binary or multi-class.

13. The system of claim 9, wherein the determining of the weighted input points for the contributing set comprises a calculation of $\{xn|yn/ypeak > 0.9\}$, in which Xn is equal to a significant input going into a neuron/AI layer, Yn is equal to the weighted input "n" to a neuron/AI in a layer, and Ypeak is equal to highest or most significant value of the weighted input for all neurons in that AI layer.

14. The system of claim 9, wherein the classifier of the machine learning model includes plurality of layers that provides a neural network, the plurality of layers including an input layer and an output layer having middle layers present therebetween.

15. The system of claim 9, wherein the input can be images for identification extracted from a data set by feature extraction element of the machine leaning engine.

16. The system of claim 9, wherein the determining of the classification output from the classifier includes a determiner engine that for each layer between the input and the output, wherein the determiner engine receives the sample of inputs stored the training data set layer values, and from comparison of the sample inputs to each layer of the draining data set, the determiner engine can find the distances and the cluster spread with the calculation:

Distance at each $xn$ $dn = \text{sqrt}(\text{sqr}(xn\text{input} - xn\text{sample}) + \text{sqr}(vn\text{input} - vn\text{sample}))$ and Total distance $= \Sigma dn/n$, wherein:

dn is equal to distance for the significant input "n",
sqrt is equal to square root,
sqr is equal to square,
v ninput is equal to weighted input for element "n",
vnsample is equal to weighted input for element "n" in the considered sample,
xninput is equal to input for element "n", and
xnsample is equal to input for element "n" in the considered sample.

17. A computer program product for increasing classifier accuracy in machine learning applications, the computer program product comprising a non-transitory computer readable storage medium having computer readable program code embodied therewith, the program instructions executable by a processor to cause the processor to:

train, using the processor, a machine learning (ML) model including a classifier across classes by determining weighted input points for a contributing set to store the position and values for true positive and true negative predications;

receive, using the processor, input data to the classifier of the machine learning model at runtime;

determine, using the processor, a classification output from the classifier, wherein for the classification output the method compares the values for input during runtime with a sample of inputs stored for training the machine learning model to determine an average distance in spread for the classification output;

determine, using the processor, a class from the classification output having a smallest distance and spread; and characterizing, using the processor, the class with the smallest distance and spread as a true positive or true negative by comparing the class with the smallest distance and spread with the classification output, wherein if the class having the smallest distance and spread that is smaller the average of the classification output the class is designated a false positive or false negative.

18. The computer program product of claim 17, wherein the input data is a query, and the true positive or the true negative is a correct answer to the query.

19. The computer program product of claim 17, wherein each of the true positive or the true negative is a class of answers.

20. The computer program product of claim 17, wherein the class can be binary or multi-class.

* * * * *